United States Patent [19]

Dilk et al.

[11] Patent Number: 4,893,218

[45] Date of Patent: Jan. 9, 1990

[54] HEADLIGHT FOR MOTOR VEHICLES, ESPECIALLY ROAD VEHICLES

[75] Inventors: Gerhard Dilk, Spiesen-Elversberg; Rolf Klaiber, Reutlingen; Kurt Kreschel, Bietigheim-Bissingen; Wolfgang Krieg, Reutlingen; Heinz Ruckwied, Kusterdingen-Wankheim; Gerhard Ulrich, Reutlingen, all of Fed. Rep. of Germany

[73] Assignee: Robert Bosch GmbH, Stuttgart, Fed. Rep. of Germany

[21] Appl. No.: 205,897

[22] Filed: Jun. 13, 1988

[30] Foreign Application Priority Data

Jun. 13, 1987 [DE] Fed. Rep. of Germany ....... 3719767

[51] Int. Cl.⁴ ............................................... B60Q 1/00

[52] U.S. Cl. ...................................... 362/61; 362/353; 313/318

[58] Field of Search ..................... 362/226, 61, 80, 83, 362/351, 353, 255; 313/318

[56] References Cited

U.S. PATENT DOCUMENTS

| | | | |
|---|---|---|---|
| 1,281,485 | 10/1918 | Berg | 362/255 |
| 4,500,946 | 2/1985 | Mikola | 362/267 |
| 4,682,274 | 7/1987 | Freudenreich et al. | 362/226 |
| 4,760,506 | 7/1988 | Mochizuki et al. | 362/226 |

*Primary Examiner*—Ira S. Lazarus
*Assistant Examiner*—Richard R. Cole
*Attorney, Agent, or Firm*—Edwin E. Greigg

[57] ABSTRACT

A reflector, made from a thermosetting plastic, has three tightening faces on its crown neck that act as a catch, into which three protrusions, such as pawls, dig in a thread-like manner with teeth of the ring. As a result, the ring secures an incandescent bulb in the reflector. By means of this unilaterally acting friction catch, lateral slides, in particular, become unnecessary on an injection holder of the reflector, which is a considerable advantage in the processing of thermosetting plastics.

19 Claims, 2 Drawing Sheets

FIG. 1
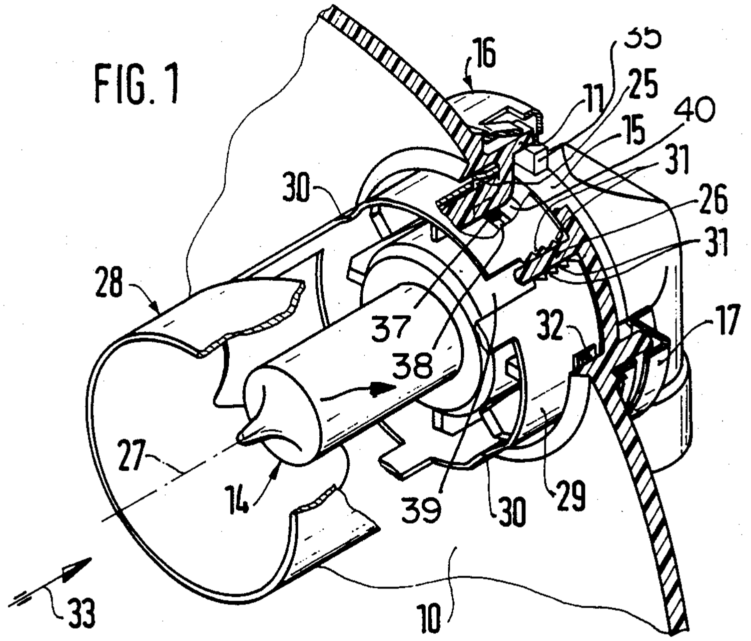
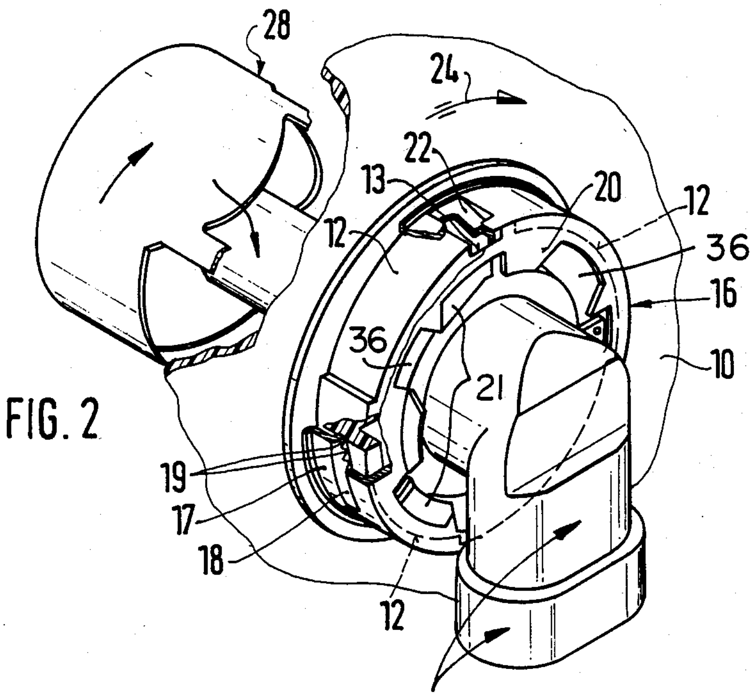
FIG. 2

HEADLIGHT FOR MOTOR VEHICLES, ESPECIALLY ROAD VEHICLES

BACKGROUND OF THE INVENTION

The invention relates to an improved headlight for motor vehicles U.S. Pat. No. 4,513,356 discloses a headlight of this kind, made of plastic. In this patent, a locking means is detachably fastened to the outer jacket of the crown neck by means of a bayonet connection, the required grooves being cut out of the outer jacket. To produce these grooves, an injection tool for the reflector requires a plurality of lateral slides, which presents technical difficulties, especially when thermosetting plastics are used.

OBJECT AND SUMMARY OF THE INVENTION

With a headlight for motor vehicles, according to the invention, the problem addressed above is overcome by technologically simple means and in a functionally reliable manner. Detachably fastening the ring on the outer jacket of the crown neck of the reflector by means of a unilaterally acting friction catch obviates the need for slides on the reflector injection tool; moreover, with the friction catch, the fastening of the ring on the crown neck and thus the functional location of the incandescent bulb in the reflector are assured even under difficult operating conditions.

Advantageous features of the invention are set forth herein. With an embodiment of the headlight as defined herein, the detachable fastening of the ring in the mounting is simple to accomplish and easy to automate. With other features, when the ring is rotated it is automatically attracted axially and a counter-tension is attained, while manufacturing tolerances are precluded. The final radial association of the ring with the crown neck of the reflector is unequivocally attained with the provisions set forth.

Depending on the type of incandescent bulb, a shade or shield should be disposed on the inside of the crown region of the reflector. Such an arrangement, which in particular makes a simple injection device for the reflector possible, is attained With one embodiment of the headlight the fastening of the shade is made more secure by means of radial bracing. Unintentional radial displacement of the shade relative to the reflector is prevented by the provision of some barbs. The resistance to jarring and the predetermined radial association of the shade to the incandescent bulb are attained with the embodiment of the headlight by the use of radial ribs. A plurality of hooks reinforces the fixation of the shade in the reflector.

The invention will be better understood and further objects and advantages thereof will be apparent from the ensuing detailed description of a preferred embodiment taken in conjunction with the drawings.

BRIEF DESCRIPTION OF THE DRAWINGS

FIG. 1 shows a detail of a headlight for motor vehicles, partially in section, including the crown region of the reflector with an incandescent bulb and a shade, seen enlarged and in a three-dimensional view;

FIG. 2 is a view corresponding to FIG. 1, but showing the reflector from the back.

DESCRIPTION OF THE PREFERRED EMBODIMENT

Figure 3:
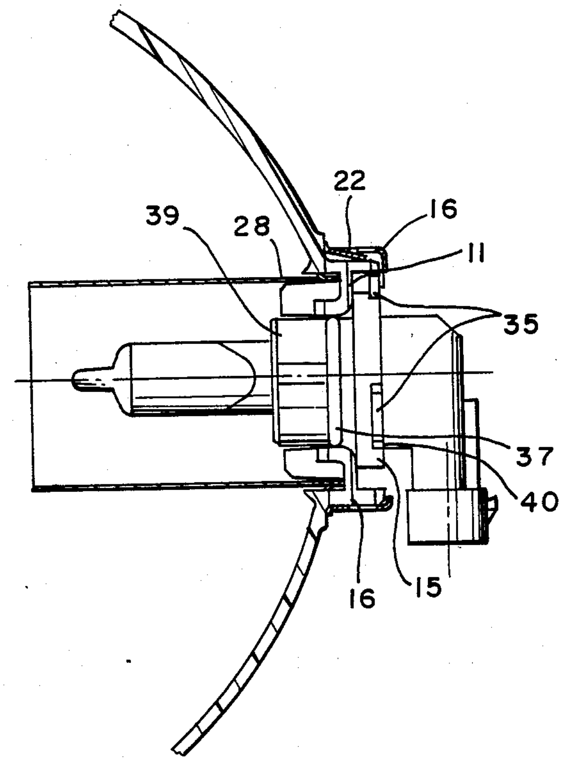
FIG. 3 is a cross sectional view through the securing means that secures the bulb to the reflector.

FIGS. 1, 2 and 3 show a headlight for motor vehicles, the reflector 10 which may be manufactured from a thermosetting plastic, has a crown neck 11 which protrudes toward the back. The outer jacket of the crown neck has three tightening engagement faces 12, which are arranged at uniform angular intervals and each of which is embodied as an inclined ramp sloping upwardly circumferentially. A radial indentation 13 is also recessed in-between each two adjacent tightening faces 12. That is, the radial indentation 13 will be between the raised end of an upwardly sloping section 12 and the beginning end of the next upwardly sloping section 12. An incandescent bulb 14 is secured in a bulb base 15, including spaced radially outwardly extending protruding parts 35, which is supported axially in the vicinity of the crown neck 11 and is radially centered thereon by use of a metal ring 16 which is secured to the crown neck of the reflector.

The metal ring 16 is of Z-shaped cross section and has three radially directed protrusions 18 in the axially directed center portion 17, which are likewise disposed at uniform angular intervals and point inward. Each protrusion 18 is inclined obliquely in the axial direction in the manner of a thread course and has a plurality of teeth 19 along a portion of its inner edge. A plurality of spaced tabs 22 also protrudes radially inward from the portion 17 of the ring 16, and a plurality of tongues 21 are cut out of the radially inward extending portion 20 and positioned to protrude radially in an axial direction.

The ring 16 is slipped onto the crown neck 11 in such a way that the protrusions 18 rest on the beginning end of tightening faces 12; after that, the ring 16 is pivoted clockwise as indicated by the arrow 24; in this process, the protrusions 18 cut, like a thread, into the radially raised sloping part of the tightening faces 12, and at the end of the pivoting movement the tab 22 is permitted to extend inwardly and locks in place in the indentation 13. The detachable fastening of the ring 16 on the outer jacket of the crown neck 11 is thus accomplished in the manner of a unilaterally acting friction catch, in which the tightening faces 12 form the body of the catch and the protrusions 18 form the pawls of the friction catch. For securing the bulb base in place, the ring has alternating recesses 36 and adjacent axially inwardly pointing spring tongues 21. The radially protruding parts 35 on the bulb base 15 pass through the recesses 36 and after being given a suitable rotational position of the bulb the protruding parts comes into contact with the adjacent spring tongues and are axially acted upon by the spring tongues 21, so that the bulb comes to rest with its protruding parts on the face-end side of the crown neck 11. This protrusion is visible in FIG. 1. The bulb is accordingly inserted in bayonet fashion into the ring 16 and then locked by being rotated. The bulb base then comes into contact with the face end of the crown neck or reflector neck 11 and an O-ring 37, which is placed in an annular groove 38 in the base 39, moves into a first cylindrical part 40 of the crown neck 11 and thus hermetically seals the interior of the headlight from the outside.

An annular groove 25 is disposed on the inside of the crown region, and a plurality of radially inwardly protruding ribs 26 are formed onto the inner flank of this groove. A shade 28 that is coaxial with the axis of the incandescent bulb 14 has a sheath 29, the face-end portion of which is corrugated in the circumferential direction, with radially inwardly oriented spherical indentations 30. The sheath 29 is longitudinally divided on its crown neck end in the axial direction by a slit, and a plurality of hooks 31 protrude from both long edges thus formed; a plurality of counterpart barbs 32 are also cut out of the sheath 29, pointing radially outward, thus the sheath 29 is secured to the reflector by the protruding ribs 26.

The shade 28 is inserted into the inside of the crown region of the reflector 10 in the following manner:

First, the slit of the sheath 29 is associated with one of the ribs 26; next, the shade 28 is axially displaced in the direction of the arrow 33 until the face-end portion of the sheath 29 engages the annular groove 25. In this process the spherical indentations 30 come to rest on both the inner flank of the annular groove 25 and on the adjacent edge of each rib 26; the barbs 32 also cut into the outer flank of the annular groove 25, and the hook 31 digs into both side faces of a rib 26.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the United States is:

1. A headlight for motor vehicles, which comprises:
- a reflector which has an outwardly protruding crown neck including an outer jacket;
- a bulb base to which an incandescent bulb is secured and which is axially secured in said crown neck and centered radially thereon;
- a ring that is detachably secured on said outer jacket of said crown neck, thereby securing the incandescent bulb base on the reflector;
- at least one unilaterally acting friction catch which detachably fastens said ring (16) on the outer jacket of the crown neck, said friction catch includes a body disposed on said outer jacket of said crown neck (11), and said ring (16) includes at least one pawl which engages said at least one friction catch; and
- said body disposed on said outer jacket of said crown neck (11) comprises a plurality of radially spaced tightening faces (12) that extend radially outward circumferentially, and that said at least one pawl comprises a plurality of radially spaced inwardly directed protrusions (18).

2. A headlight as defined by claim 1, in which said protrusions (18) are axially obliquely positioned in the manner of a thread course.

3. A headlight as defined by claim 2, in which said protrusions (18) include a plurality of teeth (19).

4. A headlight as defined by claim 2, which includes at least one tab (22) protruding from said ring (16) and a radial indentation (13) on the outer jacket of the crown neck (11) into which the tab (22) locks in place in a fastening position of said ring (16).

5. A headlight as defined by claim 2, which includes a shade disposed on the inside of a crown region of the reflector, said shade (28) includes a sheath (29) and an annular groove (25) on one side of the crown region in which said sheath (29) is inserted.

6. A headlight as defined by claim 1, in which said protrusions (18) include a plurality of teeth (19).

7. A headlight as defined by claim 6, which includes at least one tab (22) protruding from said ring (16) and a radial indentation (13) on the outer jacket of the crown neck (11) into which the tab (22) locks in place in a fastening position of said ring (16).

8. A headlight as defined by claim 6, which includes a shade disposed on the inside of a crown region of the reflector, said shade (28) includes a sheath (29) and an annular groove (25) on one side of the crown region in which said sheath (29) is inserted.

9. A headlight as defined by claim 1, which includes at least one tab (22) protruding from said ring (16) and a radial indentation (13) on the outer jacket of the crown neck (11) into which the tab (22) locks in place in a fastening position of said ring (16).

10. A headlight as defined in claim 1, which includes a shade disposed on the inside of a crown region of the reflector, said shade (28) includes a sheath (29) and an annular groove (25) on one side of the crown region in which said sheath (29) is inserted.

11. A headlight as defined by claim 10, in which said sheath (29) includes at least a face-end portion which is corrugated in a circumferential direction, with a plurality of inwardly pointing spherical depressions (30), which rest on an inner flank of said annular groove (25).

12. A headlight as defined by claim 11, which includes at least one barb (32), directed radially outward, which protrudes from said sheath (29) and which digs into an outer flank of said annular groove (25).

13. A headlight as defined by claim 12, which includes a plurality of radial ribs (26), formed onto an inner flank of said annular groove (25), which centers said sheath (29) of the shade (28).

14. A headlight as defined by claim 13, in which said sheath (29) of said shade (28) is divided longitudinally in an axial direction by a slit, which forms spaced long edges and protruding from said long edges of the sheath (29) is a plurality of hooks (31), which upon insertion of one of said ribs (26) into said slit said hooks 31 dig into both lateral faces of said rib (26).

15. A headlight as defined by claim 10, which includes at least one barb (32), directed radially outward, which protrudes from said sheath (29) and which digs into an outer flank of said annular groove (25).

16. A headlight as defined by claim 15, which includes a plurality of radial ribs (26), formed onto an inner flank of said annular groove (25), which centers said sheath (29) of the shade (28).

17. A headlight as defined by claim 16, in which said sheath (29) of said shade (28) is divided longitudinally in an axial direction by a slit, which forms spaced long edges and protruding from said long edges of the sheath (29) is a plurality of hooks (31), which upon insertion of one of said ribs (26) into said slit said hooks 31 dig into both lateral faces of said rib (26).

18. A headlight as defined by claim 1, in which said ring (16) has a cross section of a radially outward extending end, an axially extending mid-section and a radially inwardly extending end section, said mid-section includes circumferentially spaced radially directed protrusion (18), said protrusion including a plurality of teeth along an inner edge, a plurality of recesses and a plurality of radially extending spring tongues in said inwardly extending end section.

19. A headlight as defined in claim 18, in which said bulb base includes circumferentially spaced outwardly directed protrusions (35), said bulb base being secured in place by passing said outwardly directed protrusions through said recesses in said ring and rotating said bulb base so that the protrusions on said bulb base are located between said spring tongues and said crown neck of said reflector.

* * * * *